United States Patent [19]

Krojer

[11] Patent Number: 4,500,055

[45] Date of Patent: Feb. 19, 1985

[54] AIRCRAFT PROPULSION SYSTEM ARRANGEMENT

[75] Inventor: Hubert Krojer, Bermatingen, Fed. Rep. of Germany

[73] Assignee: Dornier GmbH, Friedrichshafen, Fed. Rep. of Germany

[21] Appl. No.: 490,651

[22] Filed: May 2, 1983

[30] Foreign Application Priority Data

May 21, 1982 [DE] Fed. Rep. of Germany ....... 3219159

[51] Int. Cl.³ .................. B64C 27/00; B64C 29/04
[52] U.S. Cl. .................................. 244/55; 244/87; 244/65
[58] Field of Search ............... 244/13, 45 R, 87, 55, 244/60, 36, 65, 54

[56] References Cited

U.S. PATENT DOCUMENTS

| | | | |
|---|---|---|---|
| 1,421,803 | 7/1922 | Martin | 244/60 |
| 1,806,680 | 5/1931 | Hamilton | 244/55 |
| 1,981,237 | 11/1934 | Loughead | 244/55 |
| 2,452,281 | 10/1948 | Zimmerman | 244/60 |
| 2,988,301 | 6/1961 | Fletcher | 244/36 |
| 3,073,547 | 1/1963 | Fisher | 244/60 |
| 3,136,499 | 6/1964 | Kessler | 244/60 |
| 3,592,415 | 7/1971 | Walley et al. | 244/55 |
| 3,995,794 | 12/1976 | Lanier | 244/55 |
| 4,030,688 | 6/1977 | Pellarini | 244/36 |

FOREIGN PATENT DOCUMENTS

| | | | |
|---|---|---|---|
| 76675 | 6/1948 | Czechoslovakia | 244/55 |
| 999325 | 12/1952 | France | 244/55 |
| 207347 | 3/1966 | Sweden | 244/55 |
| 576120 | 6/1946 | United Kingdom | 244/87 |

OTHER PUBLICATIONS

Jacobs, "Advanced-Design Lear Fan 2100", Popular Science, 6/81, pp. 57-59.

*Primary Examiner*—Galen L. Barefoot
*Attorney, Agent, or Firm*—Hammond & Littell, Weissenberger & Dippert

[57] ABSTRACT

In an aircraft arrangement comprising an aircraft fuselage provided with a wing on either side thereof and provided with a propeller propulsion system at the rear of the fuselage, the improvement comprising a propulsion system comprised of at least two independent propulsion units each mounted in its individual lateral fuselage section in a rear fuselage part formed by the central fuselage section originating from the outer contour of the main fuselage section and tapering toward the fuselage end, the lateral fuselage sections having an outer contour tapering in spindle form toward the fuselage rear to the diameter of the propeller spinner of each propulsion unit and propellers on each propulsion unit arranged behind the fuselage and the air frame.

11 Claims, 13 Drawing Figures

AIRCRAFT PROPULSION SYSTEM ARRANGEMENT

STATE OF THE ART

Various arrangements of propeller propulsion means for an airplane are known, particularly for turboprop propulsion systems, depending on the given layout criteria for an airplane. One example is to place one propulsion unit on each wing at both sides of the fuselage, but this type of arrangement has the disadvantage of the sudden appearance of a large disturbing moment about the yaw axis, especially when there is a sudden failure of one of the engines of the propulsion units. Moreover, this arrangement causes noise problems due to the propeller sound waves entering the passenger compartment and the twisted air streams from the propeller have an adverse effect on the airflow over the wings. Another problem with the engines arranged on the wings is that the propellers have a destabilizing effect on the airplane. One attempt to reduce these adverse effects consists in increasing the vertical tail surface but this leads to a greater airplane weight and a larger surface flown around by the air streams.

Another known arrangement for the propulsion means of an airplane comprising having a propulsion unit in both the nose of the fuselage and stern area of the fuselage but this arrangement results in aerodynamic problems caused by the influence of the flow of the propeller air stream of the nose propeller about the wing and fuselage. Thus, no laminar flow can be obtained with this type of arrangement and the arrangement of the drive means inside the fuselage consumes a large amount of the fuselage space.

A further known arrangement for the propulsion means for airplanes comprises housing the propulsion means in the so-called "tail-twin" arrangement in the rear portion of the fuselage but both propulsion units drive a common propeller which overcomes the disadvantage of the previous discussed arrangements but despite two propulsion units, there are safety problems in case of failure of the propulsion transmission means to the common propeller or in the event of damage to the propeller. Also, the diameter of the propeller circle is limited by the $\beta$ angle of rotation (clearance angle) to be initially maintained. The specific propeller load is defined by the ratio $(KW/D^2)$ where D is the diameter of the propeller circle and KW is the propulsion power. Since the jet efficiency decreases with increasing propeller load, there are relatively narrow limits to propeller layout with respect to propeller disk $D^2$.

OBJECTS OF THE INVENTION

It is an object of the invention to provide a novel airplane design with an arrangement of at least two completely independent propulsion units in the rear area of the fuselage free of prior art disadvantages and having improved stability behavior and favorable aerodynamic flow conditions.

It is another object of the invention to provide an improved structural design of the rear fuselage component of an air plane to accommodate the propulsion units.

These and other objects and advantages of the invention will become obvious from the following detailed description.

THE INVENTION

In an aircraft arrangement of the invention comprising an aircraft fuselage provided with a wing on either side thereof and provided with a propeller propulsion system at the rear of the fuselage, the improvement resides in a propulsion system comprised of at least two independent propulsion units each mounted in its individual lateral fuselage section in a rear fuselage part formed by the central fuselage section originating from the outer contour of the main fuselage section and tapering toward the fuselage end, the lateral fuselage sections having an outer contour tapering in spindle form toward the fuselage rear to the diameter of the propeller spinner of each propulsion unit and propellers on each propulsion unit arranged behind the fuselage and the air frame.

The arrangement of the invention ensures a considerable increase in safety in the event of a failure of the airplane propulsion by the completely independ driving units, each consisting of a drive unit with its own transmission means and adjoining propeller. Because of the special arrangement of the drive units, interruptions caused by the flow of the propeller air streams around the fuselage and wings are avoided and the boundary layer flow on the fuselage is received and conveyed by the propellers rotating behind the air frame. Due to the design of the central fuselage section with the lateral sections, the air flow in the area above the central section is delayed in an advantageous manner by the diffusor formation effect. Furthermore the arrangement of the driving system in the rear fuselage part has a stabilizing effect by the propellers, particularly in a lateral approach.

The arrangement of the driving units in the area of the rear fuselage part has the further advantage that, compared to the propulsion means arranged on the wings, the passenger compartment is outside the range which is admitted by the propeller sound waves and this results in a considerable reduction of the noise in the passenger compartment.

Another feature of the invention comprises the outer contour of the central section of the rear fuselage part having an increasingly flattened form with regard to the z-coordinate starting from the outer contour of the main fuselage part. This flattening of the central section in connection with the lateral, spindle-shaped fuselage sections results in an aerodynamically favorble tail design and an advantageous design of a rigid fuselage unit which is particularly suitable to receive the propulsion means and their auxiliary devices.

Referring now to the drawings.

Figure 1:
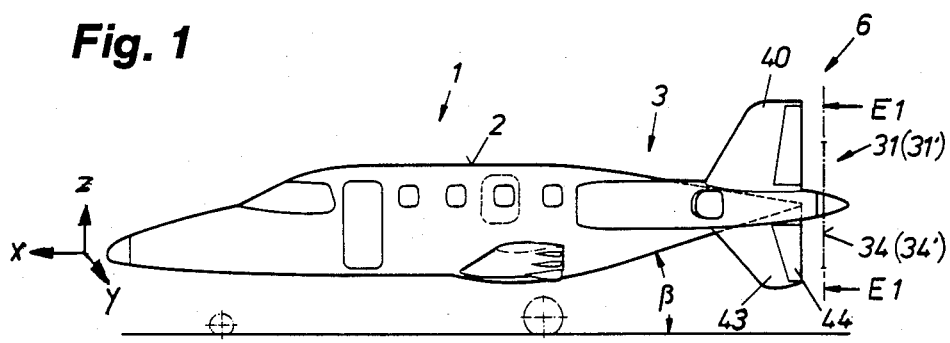
FIG. 1 is a side elevational view of one embodiment of an airplane of the invention and FIG. 2 is a top view of the embodiment of FIG. 1.

Referring in detail to the embodiment of FIGS. 1 to 4, the fuselage 1 is divided into main fuselage portion 2 containing the payload compartment and rear fuselage portion 3 carrying the tail unit and drive system 4, and the wings 5 are secured to the sides of fuselage 1. The propulsion system incorporated into rear fuselage portion 3 contains two propulsion units 8 and 8' at either side of the vertical longitudinal center plane E-E of the airplane inside the rear fuselage portion 3.

The rear fuselage portion 3 has an air frame contour to accommodate propulsion units 8 and 8' which is comprised of a central fuselage section 11 and lateral fuselage sections 12 and 12' formed as a unit. The central fuselage section 11 has an outer contour which, starting from the outer contour of the main fuselage part 2, has a flattened form increasing in the direction of the fuselage end relative to the z-coordinate. The central section 11 passes over the area of the fuselage end from the increasingly flattened form into a sharp rear edge 14 which widens in the direction of the y-coordinate. The lateral fuselage sections 12, 12' have, starting from the main fuselage part 2, a spindle-shaped contour extending to the rear and serve to accommodate the propulsion units 8 and 8'. At the rear end of the lateral fuselage sections and behind tail unit 6, there are arranged the propulsion propellers with the propeller disks 34 and 34' extending in a common turning plane E1-E1 perpendicular to the longitudinal axis of the airplane without overlapping. The spindle-shaped outer contour of the lateral sections 12 and 12' tapers in the direction of the fuselage tail to a diameter which corresponds to the diameter of the propeller spinners 32 and 32' of propellers 31 and 31' of propulsion units 8 and 8'. The drive plants 9 and 9' of the driving units 8 and 8' are arranged at a minimum distance with regard to the vertical longitudinal center plane of the airplane and also at a minimum distance following the main fuselage part 2, that is, behind the payload compartment relative to the longitudinal axis of the airplane.

To connect the propellers 31 and 31' to the drive plants 9 and 9' there are arranged inside the lateral fuselage sections 12 and 12' extension shafts 25 and 25' which are connected by clutches 26 and 26' and 27 and 27' to the output shafts of the drive plants and through reducing gears 28 and 28' resp. with the propellers 31 and 31'.

For air supply and waste gas exhaust in the drive plants, designed in this embodiment as turboprops, the lateral sections 12 and 12' of the rear fuselage part 3 surmount with their outer contour of the main fuselage part 2 for the receiving an air inlet and gas outlet system 20 and 20' and 21 and 21' resp. with the respective air inlet orificies 19 and 19' and the air supply channels. The air inlets 24 and 24' of the drive plants 9 and 9' are connected with orifices 19 and 19' by feed channels inside sections 12 and 12'.

Figure 2:
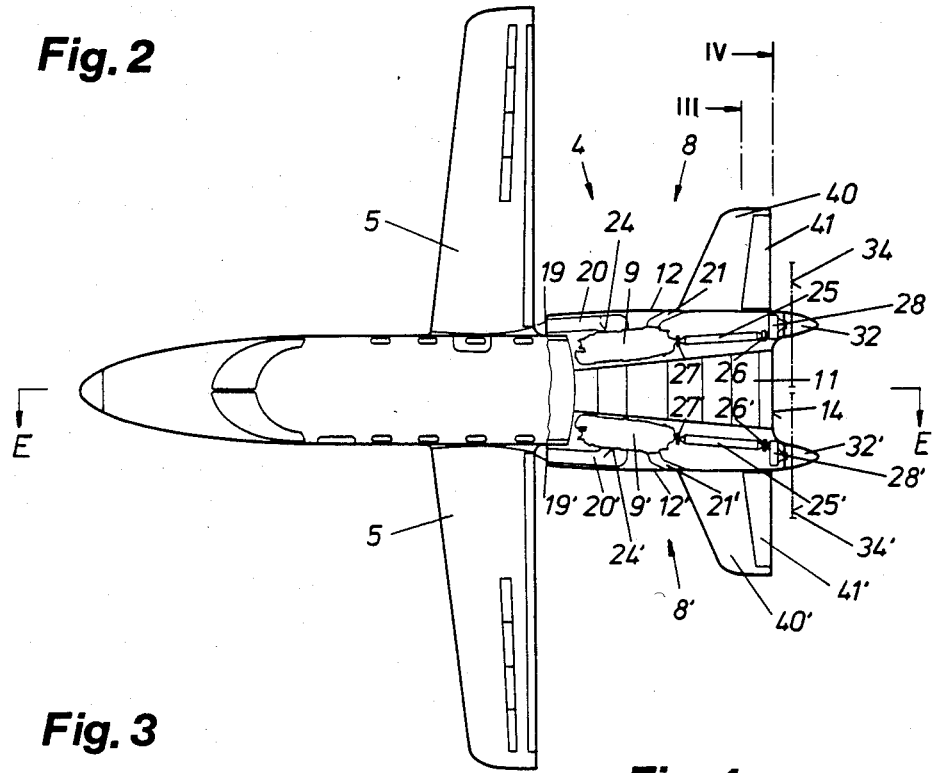

As it can be particularly seen from FIG. 2, the drive plants 9 and 9' and their respective extension shafts 25 and 25' assume with respect to their longitudinal axis of position deviating from the longitudinal center plane E-E in the direction of the tail end so that, despite the arrangement of the drive plants 9 and 9' at a minimum distance from the vertical longitudinal center plane E-E, propulsion propellers 31 and 31' with relative large disk diameters in the common turning plane E1-E1 can be provided as long as the propeller disks 34 and 34' do not overlap. The rearwardly tapering contour of the lateral sections 12 and 12' extends so that the cross sectional contour of the rear fuselage part 3 remains substantially constant over the entire longitudinal extension. The center fuselage section 11 has to this end a width which diverges in the direction of the fuselage end.

Figure 3:
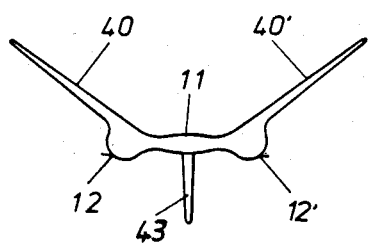
FIG. 3 is a cross-sectional view of the same embodiment taken along line III—III of FIG. 2
Figure 4:
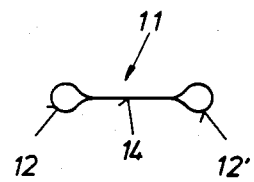
FIG. 4 is a cross-sectional view of the same embodiment taken along line IV—IV of FIG. 2.

FIGS. 3 and 4 shows the transition of the outer contour of the rear fuselage portion 3 starting from the outer contour of the mainfuselage part 2 in the area of the cross section III—III of FIG. 1 into the lateral sections 12 and 12' and the central section 11.

Figure 5:
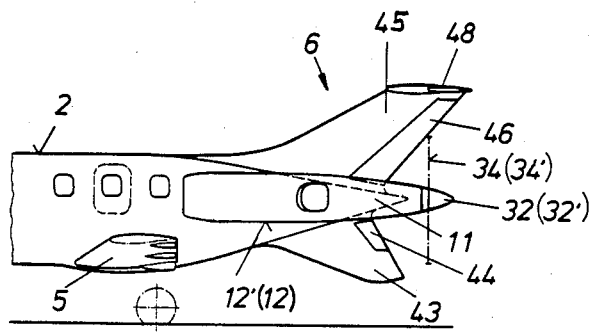
FIG. 5 is a partial side elevational view of another embodiment of an airplane of the invention and FIG. 6 is top view of the embodiment of FIG. 5.
Figure 6:
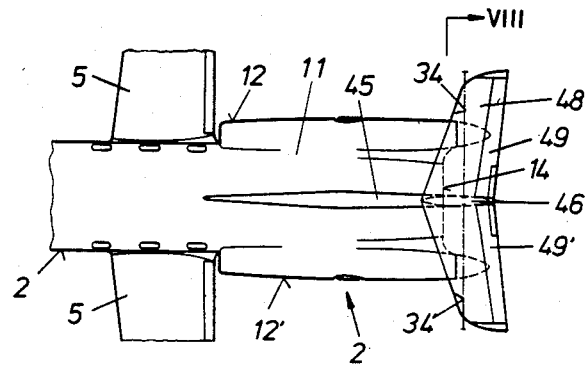
Figure 7:
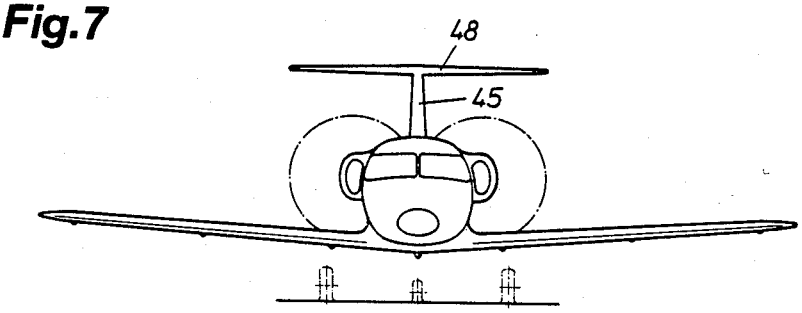
FIG. 7 is afrontal view of embodiment of FIGS. 5 and 6.
Figure 8:
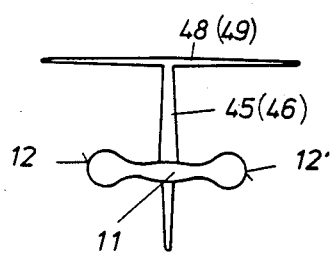
FIG. 8 is a schematic cross-section taken 9 long line VIII—VIII of FIG. 6.

FIGS. 1 to 3 and 9 as well as FIGS. 5 to 8 show two different embodiments for the arrangement and design of the tail unit with the special design of the rear fuselage portion 3. In the embodiment of FIGS. 1 to 3, the tail unit 6 is designed as a so-called Y-tail unit in which each of the spindle-shaped sections 12 and 12' carries the outwardly inclined tail unit fin 40 with its respective rudder 41, and the central section 11 carries a vertically downward pointing fin 43 with control surface 44. In the design of FIGS. 5 and 6 which relates to the design in FIGS. 1 to 4, the propellers 31 and 31' are arranged behind the fuselage tail, that is, behind the fuselage air frame.

The design of the tail unit is based on a so-called T-tail unit form in which the vertical rudder fin 45 is directed with control surface 46 to the central section 1 of the rear fuselage portion 3. Rudder fin 45 receives in a known manner in the T-tail arrangement elevator fin 48 with elevator control surface 49 and 49'. In this tail unit arrangement, the tail unit 6 surmounts the propulsion propellers 31 and 31', but here too propellers 31 and 31' are behind the fuselage air frame.

Figure 9:
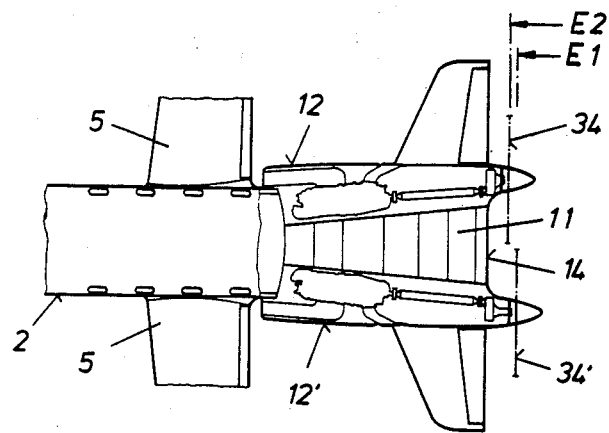
FIG. 9 is a partial top view of another embodiment of the invention with staggered or offset propeller arc planes.

In the embodiment of FIG. 9, propellers 31 and 31' are staggered relative to the longitudinal axis of the airplane so that the propeller disks 34 and 34' extend in parallel, but staggered planes E1-E1 and E2-E2, respectively. In this design, overlapping of the propeller disks 34 and 34' is also conceivable and the rest of the design of the rear fuselage portion 3 corresponds to the embodiment of FIGS. 1 to 8.

Figure 10:
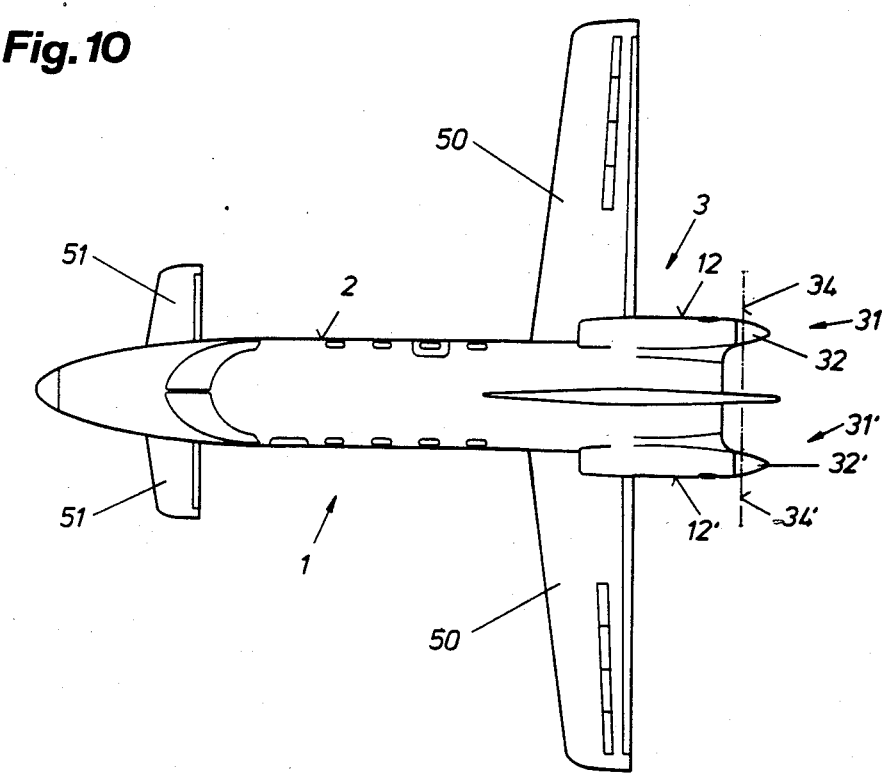
FIG. 10 is a top view of an airplane of the invention with a canard-wing configuration.

FIG. 10 shows an advantageous design of the wing unit or tail unit wherein the design is based on a generally known "canard wing-configuration" in which wings 50 are arranged in the area of rear fuselage portion 3 in connection with the lateral section 12 and 12'. The canard wings 51 are arranged in known manner in the front area of the main fuselage part 2, and in this configuration, the propeller gear directly engages the drive plant with no extension shafts and clutches.

Figure 11:
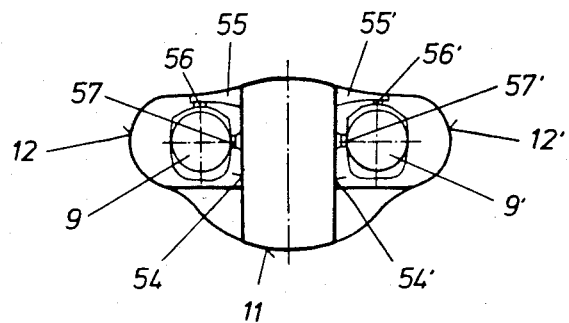
FIG. 11 is a cross-sectional view through the rear portion of the fuselage structure showing suspension elements for the drive units.

FIG. 11 shows the air frame structure of the rear fuselage portion 3 for suspension of the drive plants 9 and 9'. In the side walls 54 and 54' which extend in the longitudinal direction of the fuselage of the central section 11 there are provided yoke parts 55 and 55' with the usual suspension members 56 and 56' and 57 and 57' which cooperate with corresponding members on the drive plants 9 and 9' for their suspension on the air frame structure. The walls 54 and 54' form the lateral boundary of the central fuselage section 11 and the structural connection of the lateral fuselage sections 12 and 12'.

Figure 12:
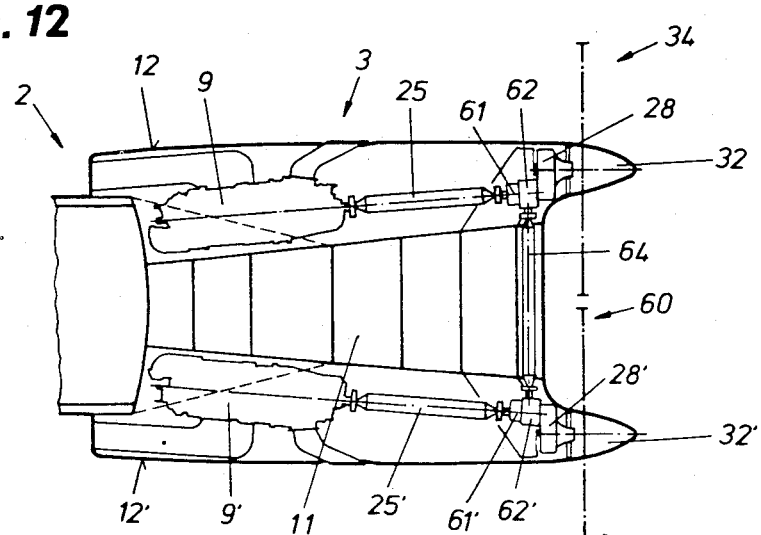
FIG. 12 is an embodiment of the drive system of the invention showing a synchronous connection between 2 drive units.

FIG. 12 shows an embodiment with a synchronous connection 60 between propellers 31 and 31' in which extension shafts 25 and 25' are connected by overrunning clutch means 61 and 61' and reduction gears 62 and 62' with propeller gears 28 and 28' and propeller spinners 32 and 32' in drive connection. The reduction gears 62 and 62' establish through a connecting shaft 64 a connection between propeller gears 28 and 28' of the drive means 9 and 9'. In the event of a drive means failure, both propellers 31 and 31' are available for production of the thrust power through reduction gears 62 and 62' and connecting shaft 64.

If one of the drive means 9 and 9' fails, this results in an improved thrust from the intact drive means. Furthermore, if one of the drive means 9 and 9' fails, the formation of a disturbing moment about the vertical axis of the airplane is avoided by the driving transmission from one of the drive means 9 and 9' to both propellers 31 and 31', where propeller blades 33 and 33' of the drive means 9 and 9' are so staggered in their rotation direction that the propeller blades of propellers 31 and 31' are positioned to fill gaps. It is possible by this means to obtain a reduction of propeller noise.

Figure 13:
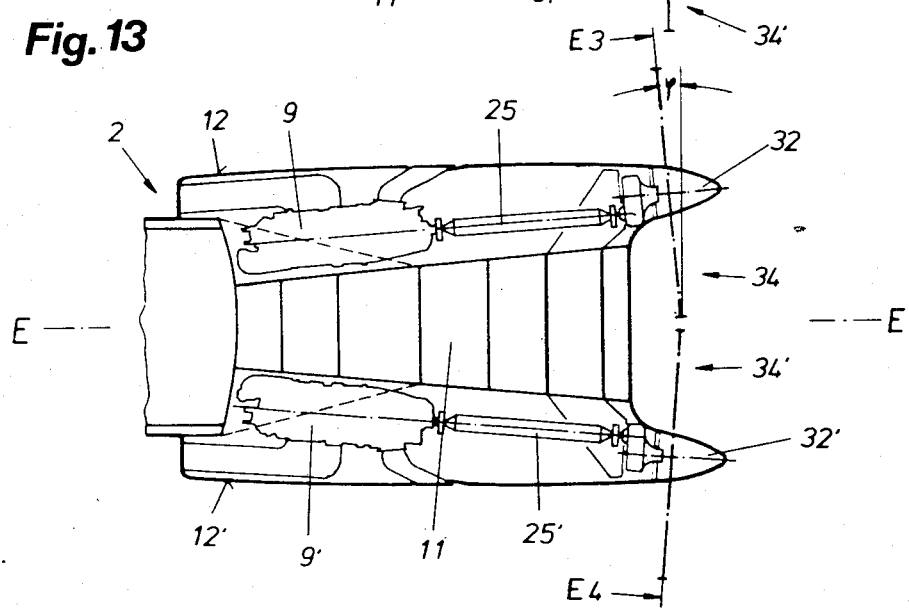
FIG. 13 is an embodiment of the invention of drive units in which the rotary circles of the propellers lie in a plane which form an angle to each other.

Finally, FIG. 13 shows an arrangement of propellers 31 and 31' wherein propeller disks 34 and 34' extend in planes E3-E3 and E4-E4 respectively which are vertical and form an angle phi with each other.

Various modifications of the propulsion system arrangement and airplane design of the invention may be made without departing from the spirit or scope thereof and it should be understood that the invention is intended to be limited only as defined in the appended claims.

What I claim is:

1. In an aircraft structure comprising a main fuselage (2) having a circular or approximately circular cross-section for cabin pressurization and a rear section (3), which is provided with a wing (5), said fuselage containing a power plant (4) in the rear section thereof, said power plant consisting of at least two independently operating propulsion units (8,8') each comprised of an engien (9,9') and a rearwardly extending drive shaft (25,25') terminating in a propeller spinner (32,32') having a pusher propeller (31,31') with propeller disk (34,34') mounted thereon, the improvement which resides in that
   (a) the fuselage rear section is formed by a central section (11) and lateral spindle-shaped engine nacelles (12,12'), where said central section and said engine nacelles form a structural unit with a blending outer contour and extend directly from the main fuselage section and together contain the propulsion units,
   (b) the longitudinal axis of each engine assumes an outwardly diverging position in the direction of the fuselage rear end,
   (c) the engines are positioned in the region of the main fuselage section partially within the main fuselage section and partially with the engine nacelles,
   (d) the engine nacelles comprise spaces for the reception of air supply (20,20') and exhaust gas ducts (21,21') lateral of the engine, and
   (e) the outer contour of the engine nacelles tapers in the area of their rear end into the circular contour of the propeller spinners.

2. The aircraft structure of claim 1, wherein the outer contour of the central section (11) of the rear fuselage section (3) has an increasingly flattened form with regard to the z-coordinate starting from the outer contour of the main fuselage (2).

3. The aircraft structure of claim 1 or 2, wherein the outer contour of the central section (11) ends in the area of the fuselage end in a sharp horizontal edge (14).

4. The aircraft structure of claim 1 or 2, wherein the outer contour of the engine nacelles (12) and (12') surmounts the outer contour of the main fuselage (2) at least partly to the outside to receive the air supply and exhaust gas ducts (20) and (20') and (21) and (21').

5. The aircraft structure of claim 1 or 2, wherein the central fuselage section (11) widens with regard to the y-coordinate corresponding to engine nacelles (12) and (12') tapering in spindle form in the direction of the sharp edge (14) of the rear fuselage section (3).

6. The aircraft structure of claim 1 or 2, wherein the engine nacelles (12) and (12') receive the additional and auxiliary means of the engines (9) and (9').

7. The aircraft structure of claim 1 or 2, wherein the engines (9) and (9') are arranged at a minimum distance from the payload compartment or main fuselage (2) with regard to their position in the direction of the longitudinal axis of the aircraft.

8. The aircraft structure of claim 1 and 2, wherein the engines (9) and (9') assume an outwardly diverging position with regard to their longitudinal axis and/or drive shafts (25) and (25') in the direction toward the rear fuselage end.

9. The aircraft structure of claim 1 or 2, wherein the propeller disks (34) and (34') of propellers (31) and (31') lie in planes perpendicular to the longitudinal axis of the aircraft and are staggered with respect to each other in the direction of the longitudinal axis of the aircraft.

10. The aircraft structure of claim 1 and 2, wherein the propeller disks (34) and (34') partly overlap.

11. The aircraft structure of claim 1 or 2, wherein the propeller disks (34) and (34') lie in planes E3-E3; E4-E4 which are inclined by an angle (phi) relative to the plane perpendicular to the longitudinal axis of the aircraft.

* * * * *

UNITED STATES PATENT AND TRADEMARK OFFICE
CERTIFICATE OF CORRECTION

PATENT NO. : 4,500,055

DATED : February 19, 1985

INVENTOR(S) : HUBERT KROJER

It is certified that error appears in the above-identified patent and that said Letters Patent is hereby corrected as shown below:

Column 2, line 49: "favorble" should read -- favorable --.

Column 3, line 32: "over the" should read -- over in the --.

Column 3, line 32: "fusealge" should read -- fuselage --.

Column 3, line 67: "orificies" should read -- orifices --.

Column 4, line 22: "mainfuselage" should read -- main fuselage --.

Column 5, line 49: "engien" should read -- engine --.

Column 6, line 8: "with" should read -- within --.

Signed and Sealed this

Ninth Day of July 1985

[SEAL]

Attest:

DONALD J. QUIGG

Attesting Officer  Acting Commissioner of Patents and Trademarks